Oct. 23, 1945.  J. R. C. QUILTER  2,387,350
PARACHUTE PACK
Filed March 18, 1944
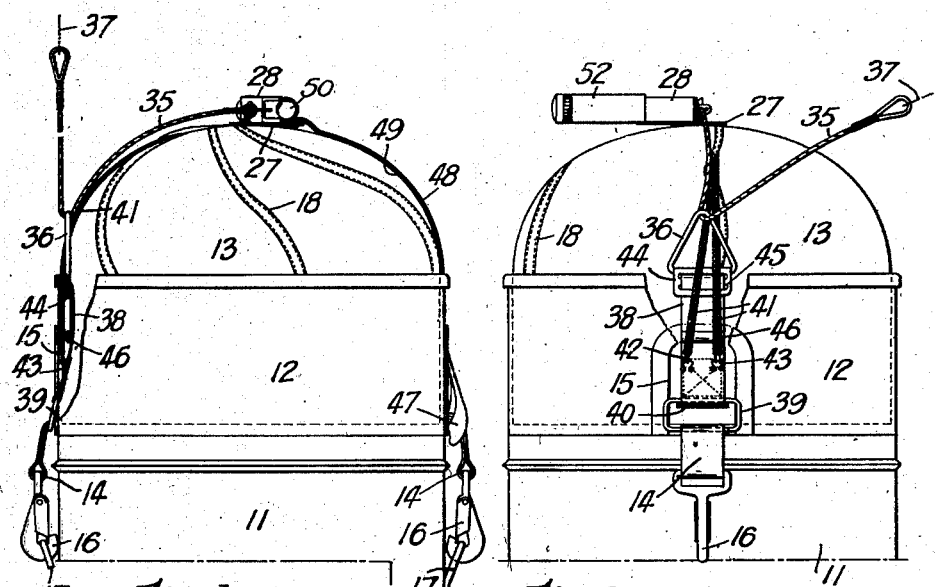
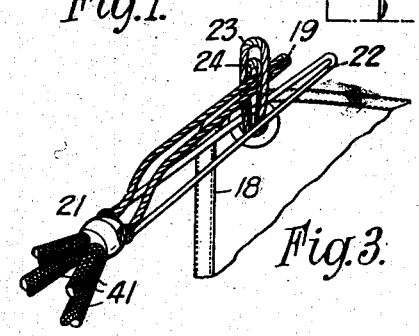
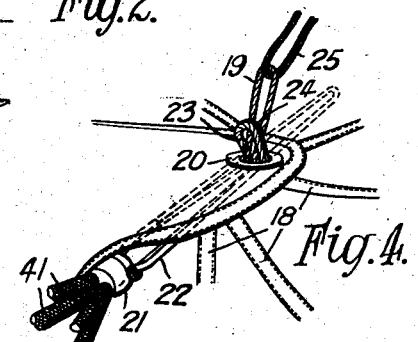
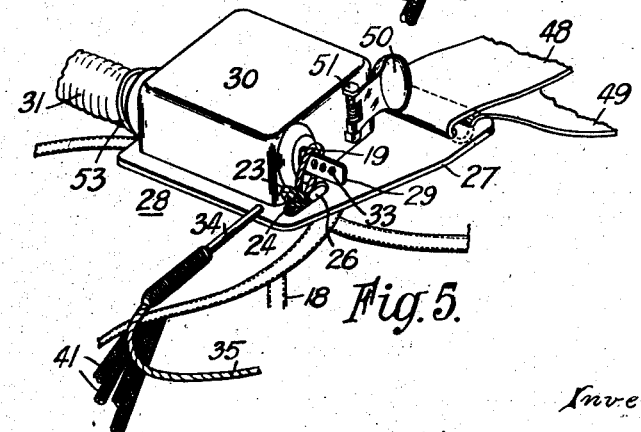
Inventor
JOHN RAYMOND CUTHBERT QUILTER
BY
ATTORNEY Patented Oct. 23, 1945

2,387,350

UNITED STATES PATENT OFFICE 2,387,350

PARACHUTE PACK

John Raymond Cuthbert Quilter, Woking, England

Application March 18, 1944, Serial No. 527,079
In Great Britain March 31, 1943

8 Claims. (Cl. 244—152)

This invention relates to parachute packs for loads to be dropped from aircraft, under static line control, with or without delayed opening of the parachutes.

The invention has for its main object to provide an improved arrangement of releasing gear for parachute-fitted loads or their containers.

A further object is to provide guiding means through which the static line is extended so that the pull of the said line when the load has dropped clear of the aircraft will more certainly release the pack retaining means.

Another object of the invention is to provide a delay-action releasing gear, in which the pull of the static line when the load has dropped clear of the aircraft disconnects it from the load and at the same instant starts a timing device for subsequent release of the pack retaining means.

More specifically, the invention has for its object to provide a parachute pack having a floating fairlead device secured thereto, said fairlead device acting as a guide through which the static line is extended to the pack retaining means or to a delay-action restraining device with a straight pulling action, irrespective of any obliquity or inclination due to the position of the falling load at the moment when the static line becomes tensioned.

Other objects and advantages of the invention will hereinafter appear from the following description of a preferred embodiment, reference being made therein to the accompanying drawing, in which:

Fig. 1 is a part-sectional elevation of one end of a load-container fitted with a parachute pack having a delay-action device arranged according to the invention.

Fig. 2 is an elevation at right angles to Fig. 1.

Figs. 3 and 4 show two stages in the closure of the cover flaps of the parachute pack.

Fig. 5 shows the delay-action device mounted upon the cover flaps.

Referring to Figs. 1 and 2, the load-container 11 is assumed to be of cylindrical shape, having at one end an open crown-section 12 enclosing a parachute pack 13, from which two sets of suspension lines 14 extend out through diametrically opposite apertures 15 in the walls of the crown section, for attachment of their hooks 16 to external shackles 17 on the sides of the container body.

The cover flaps 18 of the parachute pack are overlapped at the center and retained by a flexible wire loop 19 (see Fig. 3) which extends up through eyelets 20 in the upper flaps (see Fig. 4). The loop 19 may be attached directly to the lowermost flap, but in the construction illustrated it is provided by a separate assembly unit 21 which carries another loop 22 of stiff wire; the lowermost flap is then fitted with one or more flexible wire loops 23, 24 (see Fig. 3), through which the flexible loop 19 is threaded after the stiff loop 22 has been placed over the loop or loops 23, 24 and pressed down upon the lowermost flap 18. The object of this particular arrangement is to enable the operator to hold down the bottom flap against the upward pressure of the parachute spring inside the pack, while threading the flexible loop 19 through the other flaps; in order further to facilitate the procedure, the loop 19 may be engaged by a loose cord 25 which is used to pull the loop through the eyelets 20 of the upper flaps (see Fig. 4). The projecting portion of the loop 19 is passed through a slot 26 in the base plate 27 of a delay-action device 28 laid upon the pack cover (see Fig. 5). This delay-action device comprises a plunger rod 29 slidably mounted in a casing 30 which encloses a clockwork mechanism (not shown) controlling the return of the plunger rod under the action of a spring 31 coiled around its extremity at one end of the casing; the opposite extremity of the plunger rod 29 can be forced out of the casing by further compression of the coiled spring, so as to project over the slot 26 in the base plate, and can then be pushed through the end of the wire loop 19 which retains the cover flaps. This extremity of the plunger rod, which is preferably of flattened cross-section, has a series of perforations 33 spaced at regular intervals corresponding for example to half-seconds of time in the controlled return of the plunger rod under the action of the spring; through any one of these perforations, depending upon the length of the delay-period desired, there can be engaged a rip-cord wire or restraining pin 34 attached to the static line either directly or (as shown) through a suitable length of rip cord 35, which wire or pin 34 will be withdrawn by the pull of the static line after release of the parachute-fitted container from an aircraft.

The casing 30 of the delay-action device is preferably fitted with a dust cap 50, mounted on a hinge 51 under spring control, for preventing entrance of dust into the casing during storage; the dust-cap is shown in Fig. 5 as being held back to expose the plunger rod for engagement by the wire loop 19 and restraining pin 34. The coiled spring 31 is also preferably enclosed, as shown in Fig. 2, by a thimble or cover 52 screwed upon the boss 53; this cover serves not only to exclude dust but also to prevent the icing-up of the spring 31 due to atmospheric conditions.

The rip-cord 35 attached to the restraining wire or pin 34 is laid out upon the pack cover flaps 18 and passed through a floating fair-lead or guiding device 36 from which it extends to the static line 37 (see Figs. 1 and 2); this guiding device, consisting preferably of an open triangular metal frame through which the rip-cord 35 passes freely, is carried by a strap of webbing 38 having a length approximately equal to the depth of the pack 13, so that the suspension lines 14 extending from one side of the pack can be engaged in a ring or open rectangular metal frame 39 at the looped end of the strap before being attached to the shackle 17 on the container body. The floating fairlead device 36 will then be level with the top of the pack 13 when the strap is drawn up tight. The rectangular frame or ring 39 is preferably made of width equal to the width of the aperture 15 through which the suspension lines 14 extend, but the strap 38, which is of less width, is kept central in relation to the frame 39 by the provision of an inner guide wire 40 welded to the top bar of the frame (see Fig. 2). This strap 38 is naturally held in position by the stowing or assembly of the parachute pack 13 in the crown-section 12 of the container, the strap then resting between the pack and the wall of the crown section; in order to prevent accidental withdrawal of the rip-cord pin 34 from the perforated extremity of the plunger rod 29, the delay-action device is connected to the strap 38 by elastic cords 41, which may be similar to the pack elastics in current use, these cords extending from the assembly unit 21 down to near the looped end of the strap, with which they are engaged by means of hooks 42 and eyes 43 on the respective parts. The upper end of the strap is connected to the triangular frame or fairlead device 36 by means of a slotted metal plate 44 folded around the bottom bar of the triangle, the strap being passed through the slots 45 of this plate so that the effective length of the strap can be adjusted; the extreme end of the strap is formed into a roll 46 to prevent total disconnection.

On the other side of the container, the suspension lines 14 are engaged by the looped end 47 of an adjustable web 48 which is passed through similar slots in the base plate 27 of the delay-action device, the free end 49 of this web being drawn tight to tension the elastics 41 and then tucked neatly under the top portion of the same web (see Fig. 1). The adjustability of the strap 38 carrying the fairlead device 36 and of the web 48 allows the same delay-action device to be fitted to packs of varying sizes for containers of different weights or diameters.

When the static line 37 is pulled tight after the container has been dropped from the aircraft, the strap 38 is drawn up and the fairlead device 36 forms a floating guide for the rip cord 35 running over the top of the pack towards the rip cord wire or restraining pin 34, which will then be withdrawn from the selected perforation 33 in the plunger rod 29. The delay-action device will thereupon start into action and at the end of the desired period it will release the wire loop 19 retaining the cover flaps 18 of the pack; the parachute will then be extracted from the pack, for example by the action of a pilot parachute which is ejected by an opening spring.

The fairlead device may consist of a looped web engaging the suspension lines in a similar manner. to the web 48 and having its triangular or other guide for the rip cord 35 adjustable thereon for varying the effective length of the fairlead; the rip cord may evidently be dispensed with by passing the static line itself through the guide 36 and connecting it directly to the restraining wire or pin 34.

If desired, the delay-action device 28 may be attached loosely by a string or the like to any convenient point of the container crown-section 12, so as to prevent its loss. Alternatively, the delay-action may be secured in place, for example inside the wall of the crown-section 12, its plunger rod 29 being connected by a Bowden wire mechanism to a perforated plunger sliding in a tube or channel slotted transversely to receive the wire loop 19 or flap-retaining means under the sliding plunger and also the rip-cord wire 34 or equivalent which will be passed through one of the perforations in the sliding plunger after the delay-action device has been set to the desired length of delay; the slotted tube or channel will be laid upon the top of the pack, with its rip-cord wire or equivalent pointing towards the position of the fairlead device 36, while the Bowden wire will provide a flexible connection to the delay-action device, secured on the wall of the crown-section.

It will thus be seen the invention provides an improved arrangement of releasing gear for parachute-fitted loads or containers, in which a floating fairlead secured to the parachute pack provides a guide through which the static line passes or is extended so that the pull of the said line upon the restraining pin 34 is always substantially from the same direction or at right angles to the axis of the container or pack, even though the static line or rip cord may be inclined to the axis, as illustrated in Fig. 2, at the moment when the pull is exerted. When a delay-action device is provided, the static line initiates the operation of the timing device so that the parachute will be deployed after an interval determined by the setting of the timing device; in this case, the static line withdraws the pin 34 restraining the action of the sliding plunger of the timing gear, which engages the pack retaining means, either directly or through an extension. The delay-action device, being held only by the flexible loop 19 and web 48, is adapted to swivel over the cover flaps 18 to a limited extent to suit any obliquity of the pull resulting from the inclination of the static line or rip cord, thus avoiding possible binding or breakage of the pin 34 with consequent failure to start the delay-action device.

What I claim is:

1. A parachute pack for a load container to be dropped from aircraft, means restraining the opening of said pack, a tensile line controlling said restraining means, said controlling line being adapted for connection to the aircraft and for tensile operation by the fall of said container from the aircraft, and a fairlead device for said controlling line, said fairlead device including a flexible member attached to said container and a ring attached to the free end of said flexible member for guiding said controlling line in relation to said restraining means.

2. A parachute pack for a load to be dropped from aircraft, suspension lines extending from said pack to said load, means restraining the opening of said pack, said restraining means including a delay-action device, a line controlling said delay-action device, said controlling line being adapted for connection to the aircraft, and a fairlead device including a flexible member having one end connected to part of said suspension lines and its other end connected to a ring for guiding said controlling line in relation to said restraining means 3. In combination with a load container to be dropped from aircraft, a parachute pack fitted to said container, suspension lines extending from said pack to said container, means restraining the opening of said pack, said restraining means including a delay-action device, a line controlling said delay-action device, said controlling line being adapted for connection to the aircraft, and a fairlead device for guiding said controlling line in relation to said restraining means, said fairlead device comprising an open frame for free passage of said controlling line, an open frame for engagement around part of said suspension lines, and a flexible member connecting said open frames together.

4. In combination with a load container to be dropped from aircraft, a parachute pack fitted to said container, suspension lines extending from said pack to said container, means restraining the opening of said pack, said restraining means including a delay-action device, a line controlling said delay-action device, said controlling line being adapted for connection to the aircraft, and a fairlead device for guiding said controlling line in relation to said restraining means, said fairlead device comprising an open frame for free passage of said controlling line, an open frame for engagement around part of said suspension lines, and a flexible member connecting said open frames together, the length of said flexible member being approximately equal to the depth of said pack.

5. In combination with a load container to be dropped from aircraft, a parachute pack fitted to said container, said container and pack having a common axis, suspension lines extending from said pack to said container, means restraining the opening of said pack, said restraining means including a delay-action device engaging a cover-retaining loop of said pack, said delay-action device being located upon said pack and adapted to swivel thereon in a plane transverse to said axis, a line controlling said delay-action device, said controlling line being adapted for connection to the aircraft, and a fairlead device for guiding said controlling line in relation to said delay-action device, said fairlead device including a flexible member having one end connected to part of said suspension lines and its other end connected to a ring loosely encircling said controlling line, and said ring being adapted to float at said other end of said flexible member in a direction substantially parallel to the swivelling plane of said delay-action device.

6. In combination with a load container to be dropped from aircraft, a parachute pack fitted to said container, suspension lines extending from said pack to said container, means restraining the opening of said pack, said restraining means including a delay-action device having a sliding plunger to engage a cover-retaining loop of said pack and a restraining pin engageable with said plunger at a selected stage of its sliding movement, said delay-action device being adapted to swivel upon said pack and to a limited extent around said retaining loop, a line controlling said restraining pin, said controlling line being adapted for connection to the aircraft, and a fairlead device for guiding said controlling line in relation to said delay-action device, said fairlead device including a flexible member having one end connected to part of said suspension lines and its other end connected to a ring loosely encircling said controlling line, and said ring being adapted to float at said other end of said flexible member in a direction substantially parallel to the swivelling plane of said delay-action device.

7. In combination with a load container to be dropped from aircraft, a parachute pack fitted to said container, suspension lines extending from said pack to said container, means restraining the opening of said pack, said restraining means including a delay-action device mounted on said pack, a line controlling said delay-action device, said controlling line being adapted for connection to the aircraft, a fairlead device for guiding said controlling line in relation to said delay-action device, said fairlead device being connected to part of said suspension lines on one side of said pack, and a flexible member connecting said delay-action device to another part of said suspension lines on the opposite side of said pack.

8. In combination with a load container to be dropped from aircraft, a parachute pack fitted to said container, suspension lines extending from said pack to said container, means restraining the opening of said pack, said restraining means including a delay-action device mounted on said pack, a line controlling said delay-action device, said controlling line being adapted for connection to the aircraft, a fairlead device for guiding said controlling line in relation to said delay-action device, said fairlead device including a flexible member having one end connected to part of said suspension lines on one side of said pack and its other end connected to a ring loosely encircling said controlling line, and another flexible member connecting said delay-action device to another part of said suspension lines on the opposite side of said pack, said ring being adapted to float at said other end of the first-mentioned flexible member while guiding said controlling line in relation to said delay-action device, and said other flexible member being adapted to resist the pull of said controlling line upon said delay-action device.

JOHN RAYMOND CUTHBERT QUILTER.